United States Patent
Hackl et al.

(10) Patent No.: US 7,015,419 B2
(45) Date of Patent: Mar. 21, 2006

(54) DETECTING ELEMENT FOR A WELDING DEVICE

(75) Inventors: Heinrich Hackl, Ried/Traunkreis (AT); Franz Niedereder, Fischlham (AT); Günther Bernecker, Buchkirchen (AT)

(73) Assignee: Fronius International GmbH, Pettenbach (AT)

( * ) Notice: Subject to any disclaimer, the term of this patent is extended or adjusted under 35 U.S.C. 154(b) by 185 days.

(21) Appl. No.: 10/415,632

(22) PCT Filed: Oct. 11, 2001

(86) PCT No.: PCT/AT01/00326

§ 371 (c)(1),
(2), (4) Date: May 1, 2003

(87) PCT Pub. No.: WO02/36296

PCT Pub. Date: May 10, 2002

(65) Prior Publication Data

US 2004/0011775 A1    Jan. 22, 2004

(30) Foreign Application Priority Data

Nov. 2, 2000  (AT) ............................... A 1851/2000

(51) Int. Cl.
*B23K 9/095* (2006.01)

(52) U.S. Cl. ............................... 219/130.21; 219/137.71

(58) Field of Classification Search .......... 219/137.71, 219/130.21, 130.01; 356/28.5
See application file for complete search history.

(56) References Cited

U.S. PATENT DOCUMENTS 4,334,779 A * 6/1982 Domey et al. ............. 356/28.5

FOREIGN PATENT DOCUMENTS

| DE | 199 14984 A1 | 4/1999 |
|----|--------------|--------|
| EP | 0 157 148 A1 | 2/1985 |
| EP | 0369891 | 11/1989 |
| EP | 0369891 A2 | 11/1989 |
| FR | 2583882 A | 12/1986 |
| JP | 58-187265 A * | 11/1983 |
| JP | 06246451 | 9/1994 |
| JP | 07182551 | 7/1995 |
| JP | 07266043 | 10/1995 |
| JP | 9-295141 A * | 11/1997 |
| JP | 10206127 | 8/1998 |

OTHER PUBLICATIONS

Kramer, J. et al—"Pulse-Based Analog VLSI Volcity Sensors" 1997, (encl.).

* cited by examiner

*Primary Examiner*—Clifford C. Shaw
(74) *Attorney, Agent, or Firm*—Collard & Roe, P.C.

(57) ABSTRACT

The invention describes a welding apparatus (1), which has a current source (2) for supplying electrical power to at least one electrode at a welding torch (10) and a control system (4) co-operating with the current source (2), linked to an input device (22) for entering settings for different welding parameters, several sensing means being provided for detecting various actual values of a welding process. At least one measuring device or system for sensing mechanical motion, in particular a welding wire displacement and/or a welding torch displacement or similar, is provided, which detects a surface structure of an object.

33 Claims, 3 Drawing Sheets

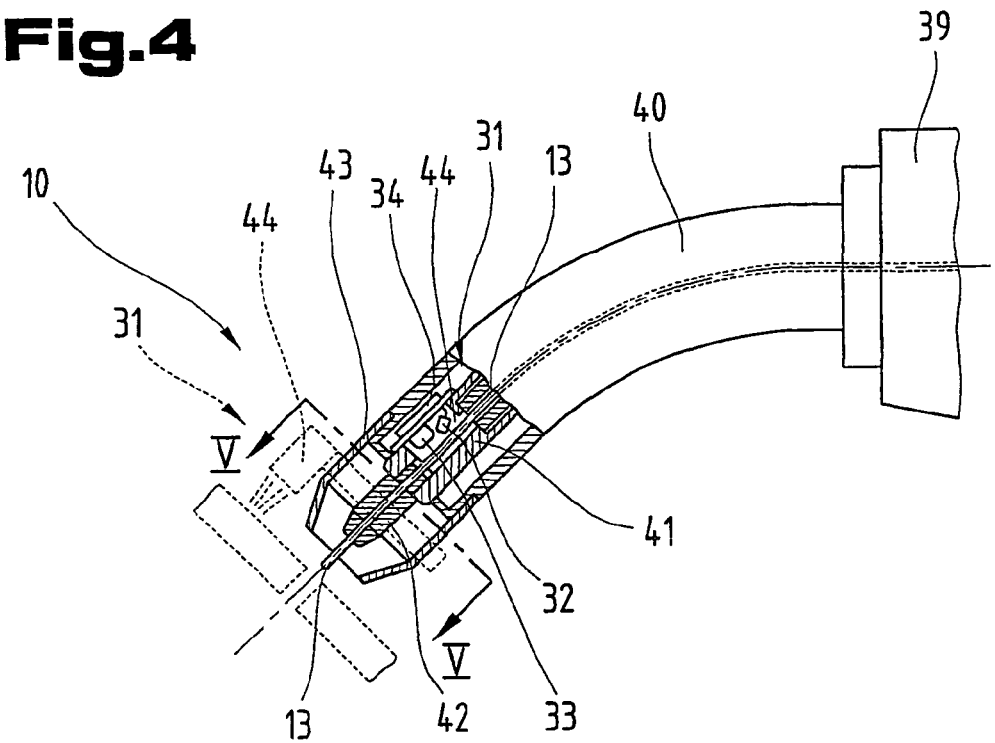
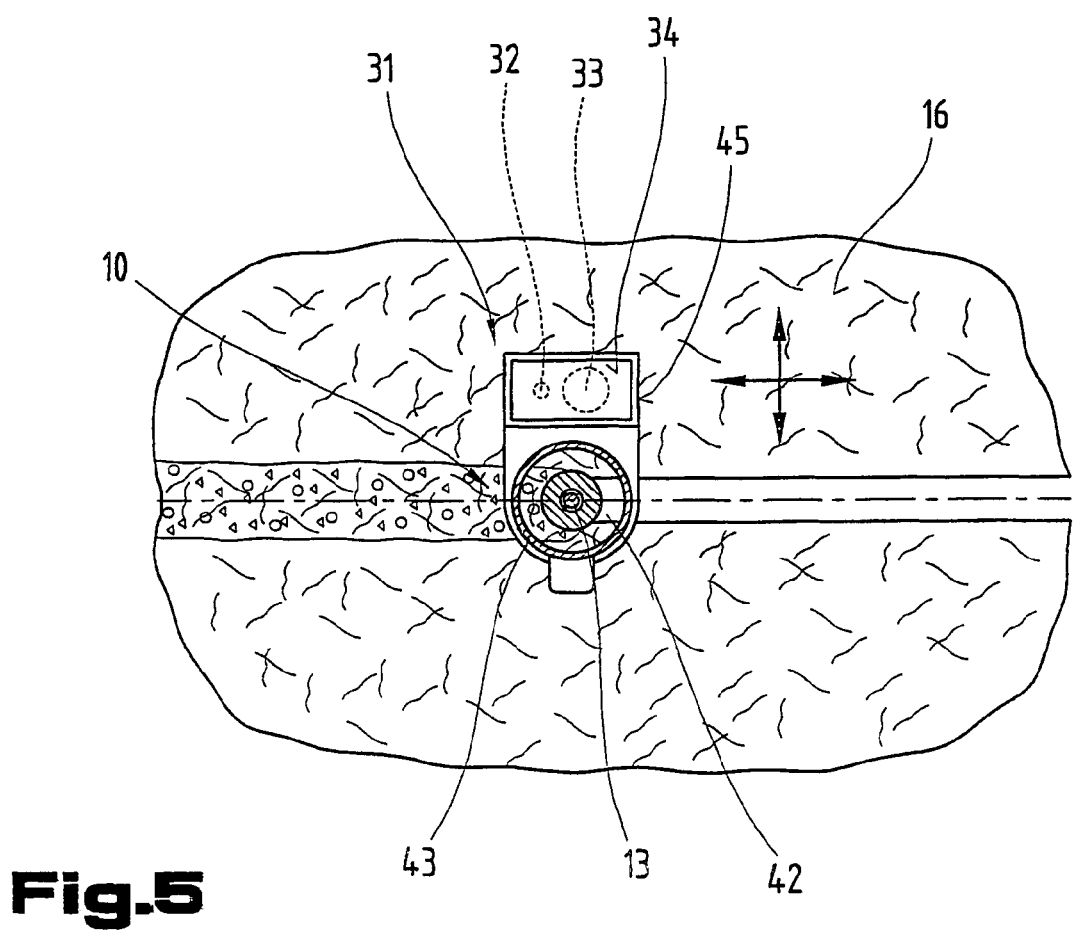

DETECTING ELEMENT FOR A WELDING DEVICE

CROSS REFERENCE TO RELATED APPLICATIONS

Applicants claim priority under 35 U.S.C. §119 of Austrian Application No. A 1851/2000 filed Nov. 2, 2000. Applicants also claim priority under 35 U.S.C. §365 of PCT/AT01/00326 filed Oct. 11, 2001.

The invention relates to a welding apparatus of the type outlined in the generic part of claim 1 and a method of controlling and/or regulating a welding apparatus of the type outlined in the generic part of claim 23.

Patent specification U.S. Pat. No. 4,591,689 A discloses a system for a robot-controlled welding system, in which the robot head is made up of a welding torch with a laser and a visual unit for sensing the reflected laser beam. The robot head can be moved into a whole range of positions by means of motors and the contactless system, in other words the laser and visual unit, monitor the welding path by reference to a groove or edge of the workpiece. A contactless measuring system of this type incorporating a laser and a visual unit does not allow a path or movement on a smooth surface to be monitored. To detect movements of this type, reference edges or grooves or ridges must be provided so that the position can be detected by scanning using the laser beam, followed by the subsequent guiding action.

A contactless method of measuring a displaced, structured object and a measuring device are known from patent specification EP 0 157 148 A, in which the surface of the structured object is scanned by means of a video camera and several brightness profiles generated. By applying a similarity function between the stored brightness profiles, the shift in position of the displaced object during the interval between two video scans is calculated and the sum of calculated shifts in position with effect from an initial instant is to calculate the length. The disadvantage of this system is that the object must have a very distinctive structure for it to be detected and evaluated by a video camera and it can not therefore be used as a rule with non-structured objects, especially a metal object.

Patent specification U.S. Pat No. 5,514,851 A also discloses a system for detecting movement of a welding torch, whereby a wheel is provided in addition to the workpiece and the welding torch and the rotation of the wheel is measured as a means of determining motion and speed.

Welding apparatus which enables mechanical motions or motion sequences, such as the welding wire feed or the welding torch motion, to be sensed are already known. Welding apparatus of this type has mechanical aids for this purpose, such as tracker rollers, by means of which motion is sensed. These tracker rollers are provided with sensors, by means of which the rotary motion of the tracker rollers is sensed, thereby enabling appropriate parameters, such as speed, acceleration, travel, etc., to be calculated.

The disadvantage of these systems is that the use of mechanical aids to sense mechanical motion enables motion to be detected on an indirect basis only and any interference factors, such as the slipping of rollers or gears can not be detected, which leads to significant distortion of the measuring results.

The underlying objective of the invention is to propose a welding apparatus, in which a mechanical motion an be detected or sensed without contact.

This objective is achieved by the invention due to the fact that at least one device or a measuring system is provided for detecting a surface structure, as a means of sensing a mechanical motion, in particular a displacement of the welding wire or a displacement of the welding torch or similar. The advantage of this approach is that by taking a direct measurement of the mechanical or manual displacement, in particular of the welding wire and/or the welding torch, actual instantaneous values can be obtained for subsequent processing, which significantly improves the quality of the welding results. The quality of a weld can be enhanced still further because the welding parameters are adapted to the actual motion, in other words the actual instantaneous values, during the welding process. Another significant advantage resides in the fact that incorrect operation of the welding apparatus, such as the welding wire burning back to the contact pipe, can be avoided, because the control system can be relied on to detect an interruption or reduction in the wire feed and thus apply an appropriate control or correction, which will prevent damage to the contact pipe and simultaneously avoid production having to be brought to a halt.

Another advantage is that because the measuring system detects displacement of the welding wire without contact, it can be retro-fitted on any welding apparatus without any major expenditure, the use of this measuring system requiring nothing more than a software modification at the control system and an equally straightforward choice as to the positioning of the measuring system.

Other advantageous embodiments are described in claims 2 to 22. The resultant advantages may be found in the description.

Irrespective of the above, the objective is also achieved by the invention due to a method of controlling and/or regulating a welding apparatus based on the features described in the characterising part of claim 23. The advantage of this approach is that comparing the surface structures of an object on the basis of predefined measuring cycles effectively prevents forward displacements from being incorrectly detected because no mechanical means, such as drive rollers, for example, are used.

Other advantageous features are described in the claims. The resultant advantages may be found in the description.

The invention will be described in more detail with reference to examples embodiments.

Of the drawings:

FIG. 4 is a simplified, schematic diagram showing an example of another application employing the measuring system on a welding torch;

FIG. 5 is a simplified, schematic diagram showing a plan view of the welding torch incorporating the measuring system, along the line of section V—V indicated in FIG. 4.

Figure 1:
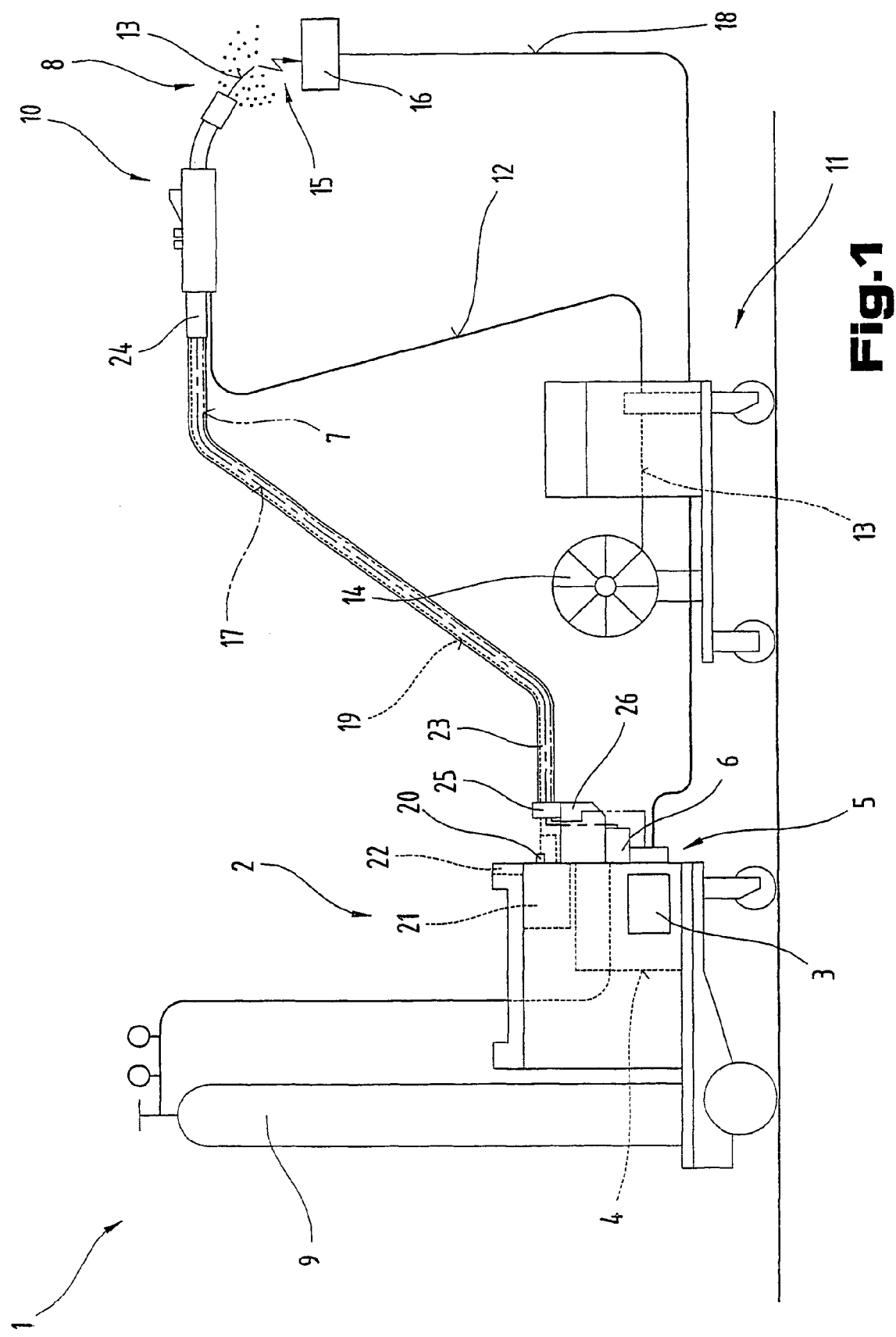
FIG. 1 is a schematic diagram showing a welding machine or a welding apparatus.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding system and a welding apparatus 1 for a whole range of welding processes, e.g. MIG-MAG welding and TIG welding or electrode welding processes. Clearly, the solution proposed by the invention may be used with a current source or a welding current source or a battery charging device.

The welding apparatus 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding apparatus 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the welding current source 2 to the welding torch 10 and the welding wire 13, the workpiece 16 to be welded also being connected to the welding apparatus 1, in particular to the welding current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding apparatus 1 also has an input and/or output device 22, by means of which a whole range of settings can be entered for welding parameters and operating modes of the welding apparatus 1. The welding parameters entered at the input and/or output device 22 are then forwarded to the control system 4, from where they are applied to the individual components of the welding system and the welding apparatus 1.

In the embodiment illustrated as an example here, the welding torch 10 is also connected to the welding apparatus 1 and the welding system by means of a hose pack 23. The individual lines from the welding apparatus 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding apparatus 1 by means of connecting sockets and plug connectors. To relieve tension on the hose pack 23, the hose pack 23 is connected via a tension-relieving device 25 to a housing 26, in particular the basic housing of the welding apparatus 1.

Figure 2:
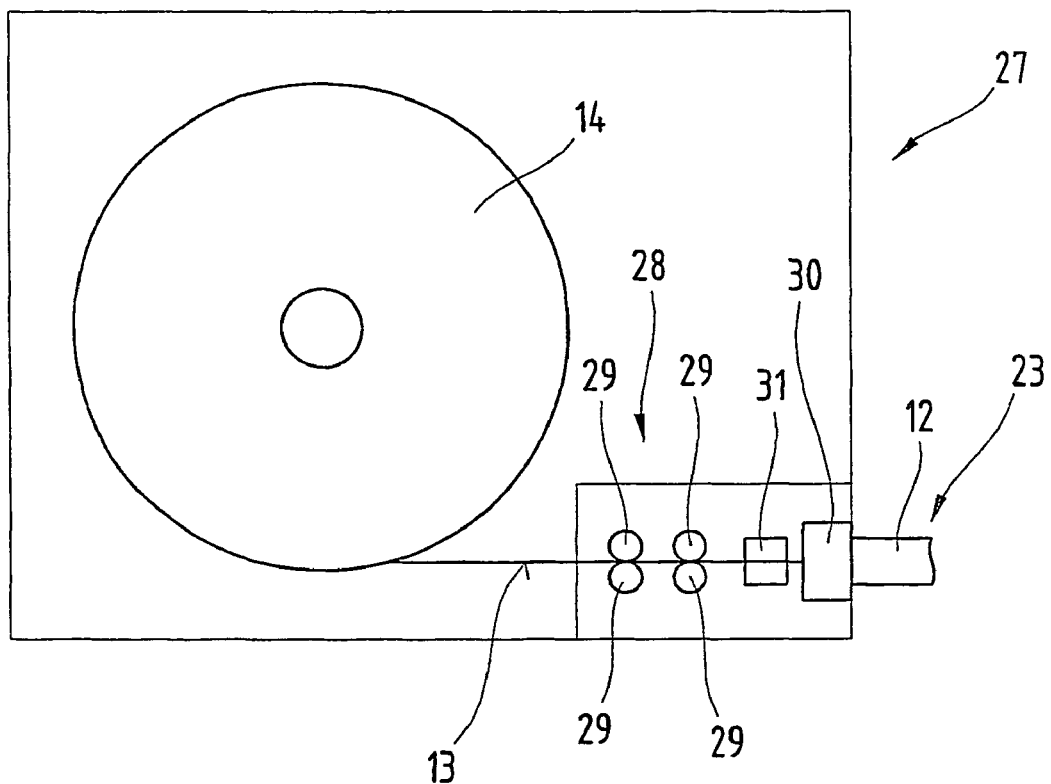
FIG. 2 is a simplified, schematic diagram showing a welding wire feed device for a welding wire, incorporating a measuring system.
Figure 3:
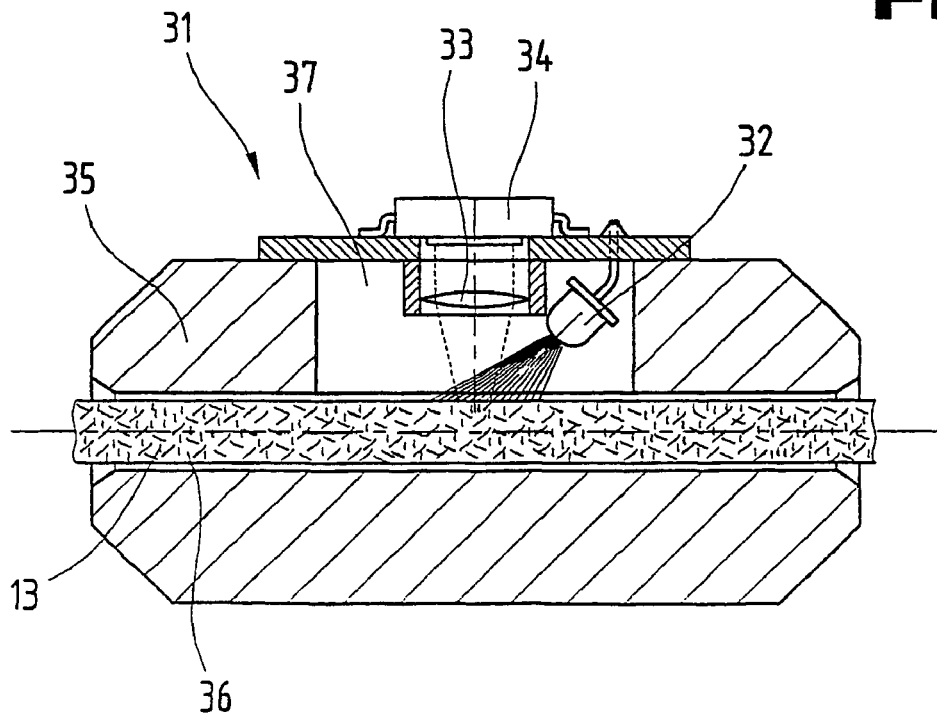
FIG. 3 is a simplified, schematic diagram of one embodiment employing the measuring system in a welding apparatus.

FIGS. 2 and 3 show a welding wire feed device 27, which may be used both in the external wire feed device 11 illustrated in FIG. 1 and in the welding apparatus 1, in particular in the housing 26 of the welding apparatus 1.

The structure of the welding wire feed device 27 is of a type known from the prior art and further details of the operating principle will therefore not be described. The welding wire feed device 27 consists of a drive system 28, incorporating driving gears 29, and a linking element 30 for the welding wire 13. The driving gears 29 are driven by at least one drive motor—not illustrated—enabling the welding wire 13 to be conveyed from the supply reel 14 via the supply line 12 or via the hose pack 23 to the welding torch 10, the linking element 30 for the welding wire 13 being fed through the supply line 12 or into the hose pack 23.

The welding wire feed device 27 also has a new type of measuring system 31, illustrated in detail in FIG. 3, for monitoring the feed motion of the welding wire, i.e. at least one device or the measuring system 31 for is provided for sensing a surface structure, as a means of detecting a mechanical motion, in particular a welding wire motion. The measuring system 31 is preferably disposed between the drive system 28 and the linking element 30.

The measuring system 31 consists of a light source 32, in particular a controlled light source 32, and an optical receiver 33 and the optical receiver 33 acts on a sensor 34, prompting the sensor 34 to detect a roughness or a surface structure of an object, in particular the welding wire 13, in multiple dimensions and stored this as a digital pattern, i.e. the object to be measured, in particular the welding wire 13, is illuminated by the controlled light source 32 so that the surface roughness or the structures of the object surface show up as a measurable contrast. The surface roughness or structures of the surface are captured by the optical receiver 33 and forwarded to the sensor 34, which detects the captured multi-dimensional pattern and stores it as a digital pattern.

After a pre-defined measuring cycle has elapsed, the surface of the object, in particular the welding wire 13, is detected again and the last detected pattern is compared with the digitally stored pattern by means of an evaluation logic integrated in the sensor 34, from which the evaluation logic of the sensor 34 will detect a shift in the pattern, enabling the distance travelled or a change of position and/or the speed of the displacement to be calculated, i.e. when the first stored pattern is evaluated, distinctive points or regions are defined and coordinates corresponding to them are fixed so that when the next pattern is detected, which naturally can also be stored, a shift in the pattern, in particular the defined pints or regions, will be detected and the modified positions of the coordinates cumulated as a distance measurement. The resultant cumulated change in travel can be used as a means of determining the total distance travelled and stored in a table with a time stamp, so that the speed of the welding wire 13 can be derived on a differential basis from the travel over time.

Once an evaluation or measuring process has been terminated, the last pattern recorded by the sensor 34 is stored as a new digital pattern for another comparison with another pattern, thereby enabling the displacement of the welding wire 13 to be monitored on a constant and continuous basis. Consequently, the measuring system 31 can be used to take a measurement of the wire forward travel and derive other values on the basis of time difference, such as the speed and/or acceleration and/or a jolt of the welding wire 13, in the welding apparatus 1 or in the wire feed device 11, in particular in the welding wire feed device 27.

This enables the speed and the transported quantity of welding wire 13 to be detected as an actual value on a more instantaneous basis, rather than sensing and monitoring the displacement of the welding wire 13 on the basis of elements acting on the welding wire 13, such as the driving gears 29 for example, as is the case with the prior art until now. To date, this has been done on the basis of the detected feed motor voltage or feed motor transmitter values of the drive system 28, in particular the drive motor, or by means of a mechanical transmitter in the form of a tracker roller. In this system, mechanical influences, in particular slipping of the gear wheels 29, are not detected, which means that erroneous data and values can arise. What this means is that in the event of slipping of the driving gears 29 or slipping of the tracking rollers, the actual value continues to be recorded but the welding wire is not displaced in the same way, and the actual value detected is not correct.

This does not happen with the measuring system 31 because detection is directly dependent on the displacement of the welding wire 13 and the measurement result remains unaffected by mechanical influences of this nature. If the new measuring system 31 is used in combination with the system known from the prior art, in particular detection of the feed motor voltage and/or the feed motor transmitter values, mechanical influences, in particular any slipping of the driving gears 29, can be detected by the control system 4, enabling an appropriate correction to be applied by the control system 4 to prevent or eliminate the mechanical influences, i.e. the control system 4 correlates the data from the measuring system 31 with the data from the drive system 28, in particular the feed motor voltage and/or the feed motor transmitter values and detects when the driving gears are slipping, enabling appropriate controls and corrections to be initiated.

To enable the measuring system 31 to forward the detected travel or position and/or speed, the measuring system 31 is connected to the control system 4 of the welding apparatus 1 by lines, in particular via a bus system or a field bus (not illustrated in FIG. 3). The control system 4 can then control the drive system 28 accordingly or run a specific correction or specific control of process parameters accordingly. For example, a current pulse may be triggered after a defined amount of welding wire has been fed along. This can be operated by releasing a droplet of a defined droplet size depending on the distance travelled by the welding wire 13. Furthermore, the data supplied by the measuring system 31 can be used to run other evaluations, for example for quality control purposes, resulting in the input of a defined quantity of material used and energy input, which can be documented for quality control purposes.

In order to be able to use such a measuring system 31, it is merely necessary for the welding wire 13 to be moved past the measuring system 31, as illustrated in detail in FIG. 3. To this end, a guide mechanism 35 with a guide bore 36 for the welding wire 13 is provided, for example. The guide mechanism 35 also has an orifice 37, extending as far as the guide bore 36, above which the measuring system 31 is directed onto the welding wire 13, i.e. the controlled light source 32 and the optical receiver 33 are oriented in the direction of the welding wire 13 as it is moves past in order to illuminate the welding wire 13 so that the roughness or structures of the surface of the welding wire 13 can be picked up by the optical receiver 33, as schematically indicated, and forwarded to the sensor 34. Using a configuration of this type means that no foreign light source will be able to interfere with the measuring area of the optical receiver 33, assuring a very high resolution. Whilst requiring a very simple set-up, it can also be used at any position along the run of welding wire to the welding torch 10.

Naturally, it would be possible to use any other configuration for the measuring system 31. Accordingly, the measuring system 31 may be used without any additional elements, such as guide mechanism 35, i.e. the measuring system 31 merely has to be disposed at a specific distance from the displaced object to be monitored, in particular the welding wire 13, in order to run the measuring process described above.

As a result of the very compact structure and the fact that the measurement is taken without the need for contact, the measuring system 31 can also be integrated in the welding torch 10, as illustrated in FIG. 4, without making it necessary to increase the dimensions of the welding torch 10. Any welding torch 10 known from the prior art may therefore be used and it is not necessary to describe the operating principle of the welding torch 10 in any further detail.

The standard welding torch 10 schematically illustrated in FIG. 4 has a hand grip 39, a torch body 40 provided with an adapter 41 and a contact pipe 42, as well as a gas nozzle 43. The measuring system 31 is preferably arranged in the vicinity of the welding process, in other words in the region of the contact pipe 42. Consequently, the adapter 41 has an opening 44 through which the measuring system 31 can take a measurement of the roughness or surface structure of the welding wire 13.

Other monitoring functions and evaluations may be run by taking a continuous measurement of the wire speed in the feed direction shortly before the contact pipe 42. Whenever a feed error occurs in the welding wire 13, due to the injector at the contact pipe 42, a bend in the welding wire 13 or a wire feed clutch mechanism slipping due to a blocked core for example, the measurement taken in the welding torch 10 may be used to prevent the contact pipe 42 from catching fire from the welding wire 13 as it emerges from the contact pipe 42 because the welding wire displacement is detected immediately before the contact pipe 42 and an appropriate control can be initiated by the control system 4 during a pause. For example, the control system 4 can halt the welding apparatus 1 and prevent further melting of the welding wire 13 by varying the process parameter accordingly, for example by reducing the output, in particular to zero.

Another possibility offered by the multi-dimensional sensing system, in particular by two-dimensional sensing, is that, as well as taking a measurement in the direction of the welding wire feed, a measurement can also be taken of the rotary and axial paths and speeds of the welding wire 13 as it is drawn towards the contact pipe 42 to monitor twisting or impacts of the welding wire 13 and detect the forced contact in the contact pipe 42. To this end, it is merely necessary to detect and set corresponding coordinates of the welding wire 13 on a one-off basis and store them, for example, in order to obtain an optimum delivery so that the control system 4 need only run a simple comparison with the data supplied by the measuring system 31 to operate this type of monitoring.

Naturally, the measuring system 31 may also be used for detecting and determining other motion sequences. This being the case, the measuring system 31 could be used in conjunction with the drive system 28, for example, in other words the driving gears 29, enabling the rotary motion of the driving gears 29 to be ascertained and the rotational travel simultaneously detected.

The measuring system 31 may also be used for monitoring functions other than sensing motion, in which case it would be possible to use the measuring system 31 to detect and monitor flaking and rust or a material of the welding wire 13 on the basis of contrast. For example, contrast could be employed for the purpose of image sensing and used as a measurement value, i.e. by activating the light source 32 depending on the control voltage or the control current, so that an actual value van be ascertained or generated and then further processed. A monitoring function of this type based on contrast may be used to detect the state of the welding wire 13, for example, in particular to detect flaking or rust or the material or composition of the welding wire 13. This being the case, an upper and lower threshold value is set in order to trigger the light source 32 so that a comparison can be run by actually activating the light source to generate an image of a specific contrast, in order to ascertain whether soiling is too extensive of if an alloy is incorrectly proportioned. To enable different alloys to be detected, different upper and lower threshold values could be stored for different welding wires 13 and the corresponding threshold values fixed or selected depending on the setting entered from the input and/or output device 22 (not illustrated in FIG. 4).

Another possible option would be to check for damage in the welding wire 13, such as scoring. A corresponding correction or control can then be applied. Whenever so-called scoring is detected by the measuring system 31 or the control system 4, for example, the contact pressure of the driving gears 29 on the welding wire 13 can then be minimised, thereby eliminating damage of this nature. This will ensure an improved wire feed for the welding wire 13.

A significant advantage of the measuring system 31 primarily resides in the fact that because the detection system operates without contact, it can be very easily retrofitted on any system and used with robot-assisted applications, since there is no need for major mechanical modifications to the existing system.

It would also be conceivable to devise applications for other motion sequences. To this end, FIG. 5 illustrates a welding torch 10 configured for measuring welding torch movements above the workpiece 16 and deriving values from these on the basis of time, such as acceleration, speed, etc., i.e. the movement of the welding torch 10 towards the workpiece 16 can be detected and evaluated by the measuring system 31 without the need for contact.

In this case, the measuring system 31 is no longer directed onto the surface of the welding wire 13 but is disposed on the welding torch 10 so that the light source 32 and the optical receiver 33 are directed onto the surface of the workpiece 16 during a welding process. This is schematically indicated by broken lines in FIG. 4, whereas FIG. 5 gives a plan view along section V—V indicated in FIG. 4.

The measuring system 31 may be of any structure and mounted by any fixing means and, in the embodiment illustrated as an example here, the measuring system 31 is attached to the gas nozzle 43 by means of a housing 45, schematically indicated. Naturally, it would also be possible for the measuring system 31 to be mounted elsewhere on the welding torch 10, such as on the torch body 40 or inside the gas nozzle 43, for example, in which case it is merely necessary to ensure that the light source 32 and the optical receiver 33 are oriented directly onto the surface of the workpiece 16.

If the measuring system 31 is used to sense or measure the surface of the workpiece 16, the movement of the entire welding torch 13 is sensed by reference to the workpiece 16, in a manner similar to that described with respect to the welding wire displacement. This can easily be set up for applications involving the use of a manual welding torch without incurring any significant change in the weight and/or flexibility of the welding torch 10.

For the purposes of manual welding or robot welding, the system provides a simple means of detecting the welding rate and the actual value for travel so that the control system 4 can adapt the welding parameters for any welding process automatically, which will considerably enhance quality. In this connection, this would enable the burning depth to be kept constant by applying an appropriate control. It would also be possible to run an adjustment to maintain a constant or pre-set welding rate, for example, for which purpose the control system 4 would be used to generate corresponding optical and/or acoustic or electronic signals for the user or another control system, which would in turn adapt the welding rates, thereby enabling the user or robot to respond accordingly if there is any variance from a pre-set welding rate.

Another option is to use a combination designed for internal and external travel measurement sensing, in other words to run the operations described with reference to FIGS. 2 to 5, resulting in various evaluation options. This being the case, the weld seam length, the amount of material applied and the energy and current input based on the machine parameters could be detected and evaluated by logging the measurement results accordingly.

Using the measuring system 31 automatically provides the user or welder with welding parameter default settings, i.e. when the welding torch 10 is switched off, welding will be detected as being at a welding rate of 0 cm/min and the control system 4 will automatically pre-set a desired value of zero for the welding power and simultaneously halt or reduce the wire feed if necessary, for example. Consequently, the output of the welding apparatus 1 can be pre-set and duly controlled depending on the welding rate.

For the sake of good order, it should be pointed out that in order to provide a clearer understanding of the welding apparatus 1, it and its constituent parts have been illustrated to a certain extent disproportionately and/or on an enlarged scale or a reduced scale.

The independent solutions proposed by the invention in respect of the underlying objectives may be taken from the description.

Above all, the individual embodiments illustrated in FIGS. 1; 2, 3; 4; 5 and their features may be construed as the subject matter of independent solutions proposed by the invention in their own right. The related objectives and solutions may be taken from the detailed descriptions of the drawings.

LIST OF REFERENCE NUMBERS

1 Welding apparatus
2 Welding current source
3 Power component
4 Control system
5 Switching element
6 Control valve
7 Supply line
8 Gas
9 Gas storage
10 Welding torch
11 Wire feed device
12 Supply line
13 Welding wire
14 Supply reel
15 Arc
16 Workpiece
17 Welding line
18 Welding line 19 Coolant circuit
20 Flow indicator
21 Water container
22 Input and/or output device
23 Hose pack
24 Connecting device
25 Tension-relieving device
26 Housing
27 Welding wire feed device
28 Drive system
29 Driving gear
30 Linking element
31 Measuring system
32 Light source
33 Receiver
34 Sensor
35 Guide mechanism
36 Guide bore
37 Office
38
39 Hand grip
40 Torch body
41 Adapter
42 Contact pipe
43 Gas nozzle
44 Opening
45 Housing

What is claimed is:

1. A welding apparatus, having a current source for supplying electrical power to at least one electrode at a welding torch and a control system co-operating with the current source, linked to an input device for entering settings for different welding parameters, several sensing means being provided for detecting various actual values of a welding process, a measuring system disposed in the welding torch upstream of a contact pipe between a drive system for the welding wire feed and a linking element (30) for a supply line (12) or a hose pack, wherein the measuring system consists of a light source, in particular a controlled light source and an optical receiver, which acts on a sensor, and the measuring system is furthermore programmed to detect the surface of the welding wire again after a pre-set measuring cycle time has elapsed and an evaluation logic compares the last detected pattern with the digitally stored pattern and the evaluation logic is programmed to detect a shift in the pattern and calculate a distance of travel or a changed position or the rate of the shift in the pattern.

2. Welding apparatus as claimed in claim 1, wherein the controlled light source is disposed so as to produce a measurable contrast when the roughness or surface structures of the object are illuminated.

3. Welding apparatus as claimed in claim 1, wherein the sensor, in particular the evaluation logic, defines distinctive points or regions when evaluating the first stored pattern and fixes coordinates corresponding to them, and, when it detects the next pattern, recognizes a shift in the pattern, in particular of the distinctive points or regions, and cumulates the altered positions of the coordinates to ascertain a travel path of the welding wire.

4. Welding apparatus as claimed in claim 1, wherein the sensor, in particular the evaluation logic, is programmed to determine an entire travel path of the welding wire from the resultant cumulated changes in travel and to store the resultant cumulated travel changes in a table with a time stamp.

5. Welding apparatus as claimed in claim 1, wherein the sensor, in particular the evaluation logic, is programmed to detect the speed and conveyed quantity of welding wire as an instantaneous and effective actual value.

6. Welding apparatus as claimed in claim 1, wherein the measuring system is connected via lines, in particular via a field bus, to the control system of the welding apparatus in order to transmit the detected travel path or position or the speed of the welding wire.

7. Welding apparatus as claimed in claim 1, wherein the measuring system is programmed to take a wire feed distance measurement and to calculate derived values based on a time differential such as a speed or an acceleration or a jolt of the welding wire (13).

8. Welding apparatus as claimed in claim 1, wherein the measuring system is programmed to take a measurement of the welding torch movement and to calculate derived values based on a time differential such as a speed or an acceleration or a jolt of the welding torch above the workpiece.

9. Welding apparatus as claimed in claim 1, wherein the control system of the welding apparatus is programmed to detect and calculate the actual quantity of welding wire displaced on the basis of the data transmitted by the measuring system.

10. Welding apparatus as claimed in claim 1, wherein the control system applies a correction to at least one welding parameter during a welding process on the basis of the data of the measuring system.

11. Welding apparatus as claimed in claim 1, wherein the control system is programmed to detect any slipping in the driving gears by correlating data from the measuring system with data of the drive system, in particular the feed motor voltage or the feed motor transmitter values.

12. Welding apparatus as claimed in claim 1, wherein the measuring system is programmed to monitor and detect any twisting or impact of the welding wire as it is fed to the contact pipe and a forced contact made in the contact pipe.

13. Welding apparatus as claimed in claim 1, wherein the measuring system, in particular the evaluation unit, is programmed to monitor contrast for the purpose of detecting flaking or rust or a material of the welding wire.

14. Welding apparatus as claimed in claim 1, comprising a guide mechanism having a guide bore for the welding wire.

15. Welding apparatus as claimed in claim 14, wherein the guide mechanism has an orifice extending as far as the guide bore, by means of which the measuring system is directed onto the welding wire.

16. Welding apparatus as claimed in claim 1, wherein the controlled light source and the optical receiver are oriented in the direction of the welding wire as it is fed past.

17. Welding apparatus as claimed in claim 1, wherein the measuring system is programmed to contactlessly sense and evaluate the motion of the welding torch towards the workpiece.

18. Welding apparatus as claimed in claim 1, wherein the measuring system is disposed on the welding torch so that the light source and the optical receiver are directed at the surface of the workpiece during a welding process.

19. Method of controlling or regulating a welding apparatus, in which various actual values of a welding process are detected by various sensing means and a welding wire displacement is sensed by a measuring system in the welding torch, in particular upstream of a contact pipe or by means of a measuring system disposed between a drive system for the welding wire feed and a linking element for a supply line or a hose pack, and the detected actual values and the detected welding wire displacement are used to control or regulate the welding process, comprising the steps of detecting the welding wire displacement in such a way that a surface structure of the welding wire is detected and stored by the measuring system and after a predefined measuring cycle time has elapsed, again detecting the surface structure of the welding wire, after which the detected surface structures are compared by an evaluation logic of the measuring system and a corresponding shift in the surface structures is recognized and detected, whereupon a travelled distance of the welding wire or a changed position or a speed of the welding wire is calculated.

20. Method as claimed in claim 19, wherein the forward feed motion is detected by the measuring system and an optical receiver acts on a sensor which detects a roughness or the surface structure of the welding wire, in multiple dimensions and stores it as a digital pattern, for which purpose the welding wire is illuminated by a light source of the measuring system, in particular a controlled light source.

21. Method as claimed in claim 19, wherein the surface structure of the welding wire is detected by the measuring system again once a predefined measuring cycle time has elapsed, whereupon an evaluation logic in the sensor compares a first detected pattern with a digitally stored pattern so as to detect a shift in the pattern and calculates from this the distance travelled or a changed position or a rate of shift in the pattern of the welding wire.

22. Method as claimed in claim 19, wherein the welding wire, is illuminated by the controlled light source so that the roughness or surface structures of the welding wire produces a measurable contrast.

23. Method as claimed in claim 19, wherein distinctive points or regions are defined by the sensor during evaluation of the first stored pattern, for which corresponding coordinates are fixed, and, when the next pattern is detected, the measuring system recognizes that there has been a shift in the pattern, particularly in the defined points or regions, and detects the changed positions of the coordinates as a cumulated travel distance of the welding wire.

24. Method as claimed in claim 19, wherein the resultant cumulated change in distance is used to determine the total distance travelled by the welding wire, which is stored in a table with a time stamp.

25. Method as claimed in claim 19, wherein the speed and the quantity of welding wire transported are detected as an instantaneous or effective actual value.

26. Method as claimed in claim 19, wherein the detected distance travelled or position or speed of the monitored welding wire is forwarded by the measuring system via lines, in particular via a field bus, to the control system of the welding apparatus.

27. Method as claimed in claim 19, wherein a distance measurement of a wire displacement and its derived values based on time differential, such as a speed, an acceleration or a jolt of the welding wire, are run or calculated by the measuring system.

28. Method as claimed in claim 19, wherein the actual amount of welding wire fed along is detected or calculated by the control system of the welding apparatus on the basis of the data transmitted by the measuring system.

29. Method as claimed in claim 19, wherein corrections are run or applied to the welding parameters by the control system during a welding process on the basis of the data from the measuring system.

30. Method as claimed in claim 19, wherein the control system detects any slipping of the driving gears on the basis of the data of the measuring system correlated with the data from the drive system, in particular the feed motor voltage or the feed motor transmitter values.

31. Method as claimed in claim 19, wherein any twisting or impacts of the welding wire as it is fed towards the contact pipe and the forced contact in the contact pipe are monitored and detected by the measuring system.

32. Method as claimed in claim 19, wherein the contrast for detecting flaking or rust of a material of the welding wire is monitored by the measuring system.

33. Method as claimed in claim 19, wherein the controlled light source and the optical receiver are directed towards the welding wire as it is fed past.

* * * * *